US006782705B2

(12) United States Patent
Lidman et al.

(10) Patent No.: US 6,782,705 B2
(45) Date of Patent: Aug. 31, 2004

(54) METHOD AND SYSTEM FOR CONTROLLED COOLING OF SMALL MILK QUANTITIES

(75) Inventors: Magnus Lidman, Ronninge (SE); Carolus Marinus Bernard Versteijnen, Haren (NL); Anders Bjork, Norsborg (SE); Lars Kall, Stockholm (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 10/183,000

(22) Filed: Nov. 25, 2002

(65) Prior Publication Data

US 2003/0131619 A1 Jul. 17, 2003

(30) Foreign Application Priority Data

Feb. 4, 2000  (SE) ............................................. 0000362

(51) Int. Cl.$^7$ ............................ F25D 17/02; B67D 5/62; A01J 3/00; A01J 5/00; A01J 7/00
(52) U.S. Cl. ........................ 62/201; 62/392; 119/14.01; 119/14.55
(58) Field of Search ...... 62/201, 392; 119/14.01–14.55

(56) References Cited

U.S. PATENT DOCUMENTS

| | | | |
|---|---|---|---|
| 3,035,543 A | | 5/1962 | Duncan et al. |
| 3,731,494 A | * | 5/1973 | Fleck ........................... 62/157 |
| 5,080,040 A | * | 1/1992 | van der Lely et al. .... 119/14.09 |
| 5,195,456 A | * | 3/1993 | van der Lely et al. .... 119/14.09 |
| 5,957,081 A | * | 9/1999 | van der Lely et al. .... 119/14.09 |
| 6,212,899 B1 | * | 4/2001 | Ward ............................ 62/389 |

FOREIGN PATENT DOCUMENTS

| | | |
|---|---|---|
| EP | 0 325 523 | 7/1989 |
| EP | 0 471 598 | 2/1992 |
| EP | 0 682 470 | 11/1995 |

* cited by examiner

*Primary Examiner*—William C. Doerrles
*Assistant Examiner*—Filip Zec
(74) *Attorney, Agent, or Firm*—Young & Thompson

(57) ABSTRACT

A method and system for controlling the cooling of small milk quantities in a cooling tank (2) having a bottom wall portion (12) with a milk cooling surface (12') within the tank being part of a cooling circuit an agitator (19) within the tank for stirring the milk therein. The gist of the invention is a) providing an element for measuring the milk quantity in the tank, and a temperature transducer (11) for monitoring the milk temperature in the tank, b) providing, in the cooling circuit, an evaporator (4) connected to the bottom wall portion of the tank, a compressor (5), and a condenser (7), c) controlling the temperature of the refrigerant in the evaporator by regulating the vaporizing pressure, so that the temperature of the milk cooling surface (12') is always higher than 0° C. when the compressor (5) is running, d) monitoring the milk quantity in the tank, and, when sufficient/insufficient for the agitator to work properly.

9 Claims, 2 Drawing Sheets

METHOD AND SYSTEM FOR CONTROLLED COOLING OF SMALL MILK QUANTITIES

TECHNICAL FIELD OF THE INVENTION

The present invention relates on one hand to a method as defined in the preamble of claim 1, and on the other hand to a system as defined in claim 8.

Such method is adapted to control the cooling of small milk quantities (milk spots) entering consecutively and with time intervals a cooling tank in which there are arranged agitator means and at least one milk contacting cooling surface being part of a cooling circuit.

A system suitable for carrying out such method includes a cooling tank containing an agitator means and a milk cooling surface being part of an evaporator in a cooling circuit.

BACKGROUND OF THE INVENTION

An automatic milking system (AMS) allows dairy cows to be milked voluntarily or on demand with little or no human interaction. In a milking machine used in an AMS the milking is carried out per individual quarter of the milked cow's udder. To minimize the bacterial growth and contents of free fatty acids (FFA) in milk extracted from a cow being milked by a quarter milking arrangement it is highly desirable to cool down the milk as soon as possible before or at the latest in the refrigerated bulk tank. In an AMS relatively small quantities of milk occasionally will have to be conveyed to the bulk tank. This is the case particularly during the night when there might be periods of considerable duration with only a low flow of milk because of a low activity of the cows for milking. Long delivery lines for the milk from the teat cups to the bulk tank will of course further emphasize the necessity of effectively cooling the milk as soon as it enters the bulk tank, or the first refrigerated tank in the system.

In some cases it may be appropriate to use a collecting pre-cooling auxiliary tank upstream of the refrigerated bulk tank.

However, in view of the occasionally small milk quantities (milk spots) entering such the cooling tank (which may be the usual refrigerated bulk tank or some other cooling tank) there is an obvious risk that the milk spots entering such nearly empty cooling tank (direct expansion) will be freezing on the cooling surfaces thereof. Such freezing of the milk will have a detrimental effect on the milk quality.

OBJECT OF THE INVENTION

A primary object of the invention is to maintain a high milk quality by avoiding the risk of milk spot freezing on cooling surfaces in an empty or nearly empty cooling tank (either a refrigerated bulk tank or some other type of tank), especially when the milk is entering such tank in small quantities (milk spots) fed into the tank with considerable time intervals between said milk quantities (spots).

Thus, in other words the problem is to be able to cool down a small milk quantity, e.g. a thin milk layer, on the bottom of a milk cooling tank without any risk of ice formation in the milk, since such ice formation will deteriorate the milk quality. This problem is further accentuated in case an effective stirring of the milk is not possible, e.g. because of a faulty stirrer (agitator means) or since the milk quantity is too small (e.g. too shallow milk layer) for the stirrer to be able to work satisfactory.

A secondary object of the invention is to be able to use a smaller and cheaper cooling apparatus having a smaller cooling capacity than present cooling tanks, but nevertheless, when necessary, a quite sufficient capacity to be able to cool the flow of milk from a number of high-producing cows, using the milking system in rapid succession.

SUMMARY OF THE INVENTION

The objects of the invention are achieved by utilizing the cooling method defined in claim 1, and by means of the system defined in claim 8. Steps and features adapted to elaborate the invention are provided in claims 2–7 and 9–10, respectively.

The method according to the invention is characterized by the following main steps:

a) providing a means for measuring the milk quantity in the tank, and a temperature transducer for monitoring the milk temperature in the tank, b) providing, in series in the cooling circuit, an evaporator connected to the bottom wall portion of the tank, a compressor, and a condenser, c) controlling the temperature of the refrigerant in the evaporator by regulating the vaporising pressure, so that the temperature of the milk contacting cooling surface is always at least slightly higher than 0° C., whereas the refrigerant temperature in the evaporator is below 0° C. when the compressor is running and, d) monitoring, by said measuring means, the milk quantity in the tank, and, when said milk quantity turns out to be sufficient/insufficient for the agitator means to work properly, starting/stopping the operation of the agitator means.

The temperature transducer (which is adapted to monitor the milk temperature in the tank) may be arranged within the tank or on the outside of the tank. It is not the location of the temperature transducer per se that matters, but its ability to provide a representative value of the milk temperature inside the tank.

If the temperature transducer is to be arranged on the outside of the tank, a suitable position would be on the outer surface of the tank wall, preferably on the outside of the tank bottom wall at a distance from the evaporator.

The temperature measuring transducer may be any suitable type of electric/electronic temperature measuring device.

The evaporator, which is connected to the bottom wall portion of the tank, may comprise refrigerant conveying channels between the outside of the bottom wall portion of the tank and the inside of a sheet casing welded to said wall portion on the outside thereof. The refrigerant is vaporized (at a low pressure) in these channels by means of heat supplied by the milk inside the tank. A refrigerant temperature below 0° C. in the evaporator will actually be obtained only when the compressor has been running for a while.

The gist of the invention is to prevent ice formation in the milk at the bottom of the tank by monitoring and controlling the pressure of the refrigerant in the evaporator.

From a general point of view the milk cooling process mainly depends on: the milk quantity in the tank; the size of the milk cooling surface; the temperature difference between the temperature of the milk to be cooled and the vaporising temperature of the refrigerant in the evaporator; and the flow of the milk over the cooling surface.

Various steps for obtaining the desired control characteristics are defined in the dependent claims 2–7.

In view of the fact that the milk supplied to the cooling tank enters same in the form of small quantities or spots with time intervals (i.e. spread over the 24 hours of a day and night) the cooling circuit apparatus (compressor, condenser and evaporator) can be a small and cheap unit having a rather limited cooling capacity.

Since the evaporation temperature (i.e. vaporising temperature) depends on the pressure in the evaporator, it is desirable to be able to control that pressure.

Furthermore, according to the invention a system (i.e. arrangement) for controlled cooling of milk spots is defined by the features of claim 8.

In such a system, the cooling circuit comprises in series therein an evaporator, a motor-driven compressor being connected to a refrigerant outlet from the evaporator and, through an interconnected condenser and an expansion valve downstream thereof, to a refrigerant inlet to the evaporator. A milk quantity measuring means and a temperature transducer (for monitoring the milk temperature in the tank) are provided in the system. The temperature transducer may be positioned within the tank or on the outside thereof, and the milk quantity measuring means may be placed in a part of the milking equipment upstream of the tank, or in a wall section of the tank, or even within the tank.

Preferably, a control equipment is connected to the temperature transducer (for receiving a temperature input) and also to the motor driving the compressor for regulating same. A temperature sensor, which is connected between the evaporator outlet and the compressor inlet and senses the temperature of the vapour flow there between, serves to control the expansion valve.

Furthermore, a pressure sensor, which is connected between the temperature sensor and compressor inlet and serves to sense the pressure of the vapour, submits an output signal to the control equipment.

BRIEF DESCRIPTION OF THE DRAWINGS

The invention will now be further described and elucidated below by means of examples of preferred embodiments of a system illustrated on the enclosed schematic drawing.

On the drawings.

DETAILED DESCRIPTION OF PREFERRED EMBODIMENTS

Figure 1:
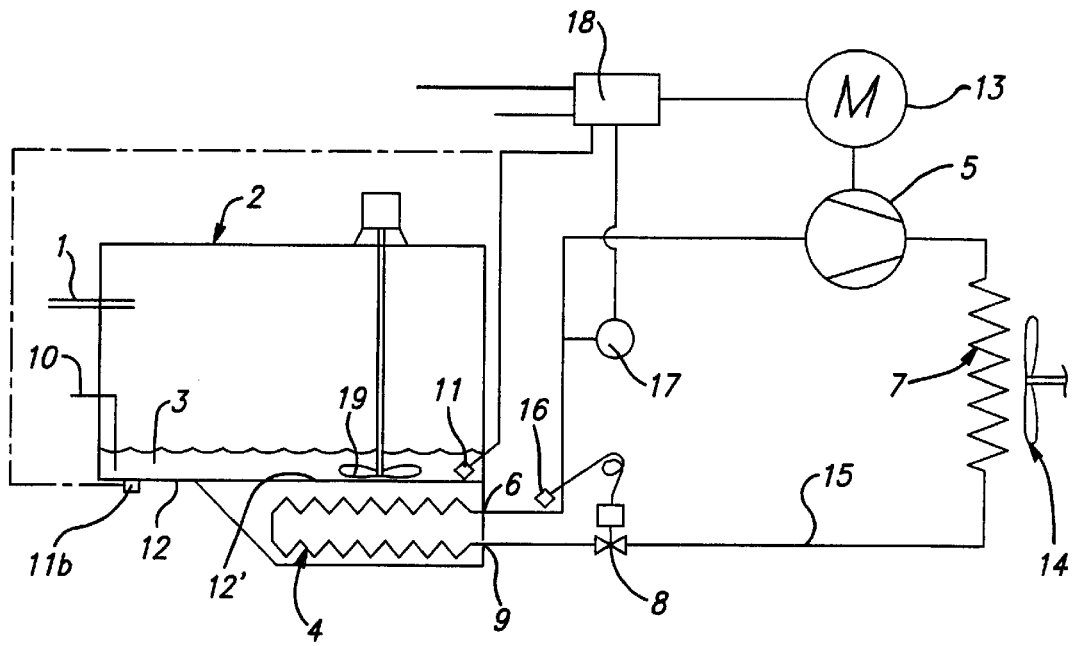
FIGS. 1–4 show very schematic representations of a cooling system working according to the method of the present invention.

The four figures on the enclosed drawings show some alternative systems or arrangements for controlled cooling of milk spots (=small milk quantities) entering, through a milk inlet tube 1, consecutively and with time intervals a cooling tank 2 used as a collecting milk tank downstream of the teat cups (not shown) of a milking machine being part of an automatic milking system (AMS), or preferably a voluntary milking system (VMS). The milk volume within the tank 2 is designated 3, and this milk volume can be cooled by means of a cooling circuit described in more detail below with reference to the individual figure. The cooling circuit comprises in series therein an evaporator 4, a motor-driven compressor 5 being connected to a refrigerant outlet 6 from the evaporator and, through an interconnected condenser 7 and an expansion valve 8 downstream thereof, to a refrigerant inlet 9 to the evaporator, and a milk quantity measuring means 10 and a temperature transducer 11 (for monitoring the milk temperature in the tank 2) are provided within the tank 2.

However, such temperature transducer may, alternatively, be located on the outside of the tank wall, e.g. like transducer 11b indicated in FIG. 1.

The measuring means 10 may be of any suitable type and may, or may not, comprise a sensor positioned inside the tank or integrated in a wall portion of the tank. The measuring of the milk quantity may be a milk level measurement or a weighing of the tank inclusive its milk content.

More specifically, FIGS. 1–4 show some arrangements for controlling the vaporizing pressure. In FIG. 1 the evaporator 4 normally comprises cooling channels being placed below a bottom wall portion 12 of the tank wall, adjacent the outside thereof. The milk contacting cooling surface on the inside of the wall portion 12 is designated 12'. The cooling compressor 5 is provided with a driving motor 13. The condenser 7 for pressurized refrigerant is cooled by means of a fan 14, but alternatively the condenser may be cooled by water. Condensed refrigerant can flow to the expansion valve 8 via a tubing 15. When the compressor 5 is started, the pressure in evaporator 4 is lowered, and this pressure reduction also has an influence on expansion valve 8, so that the valve opens and admits refrigerant into the evaporator. The expansion valve is provided with a means 16, which senses the temperature of the flow vapour from the evaporator to the compressor. If the temperature of this flowing vapour drops, the expansion valve will throttle down the flow of refrigerant. This superheating of the vapour can be used to prevent that the evaporator becomes filled with refrigerant liquid, so that such liquid is carried away to the compressor. The cooling compressor is started and stopped by the temperature transducer 11 provided in the milk tank.

In FIG. 1 the cooling assembly has a pressure sensor 17. When the pressure and temperature in the evaporator drop below a pre-set value, and when there is a risk of ice formation in the milk at a small filling volume and defective agitator action, the control equipment 18 is affected so that the compressor is temporarily stopped. The control equipment will restart the compressor after a time period determined by the milk quantity in the tank and/or the milk temperature in the tank. When the milk quantity in the tank is sufficient for the ordinary agitator 19 (e.g. a stirrer vane) to be able to operate properly, the control from the pressure sensor 17 is by-passed. The milk flow is measured by milk meters (not shown) in the milking equipment and is registered in a central control unit (not shown), which provides the control equipment 18 of the cooling assembly with all necessary signals for restarts and adjustments. Even the milk quantity, otherwise measured by a measuring means 10, can be determined by means of signals from the upstream milk meters.

Figure 2:
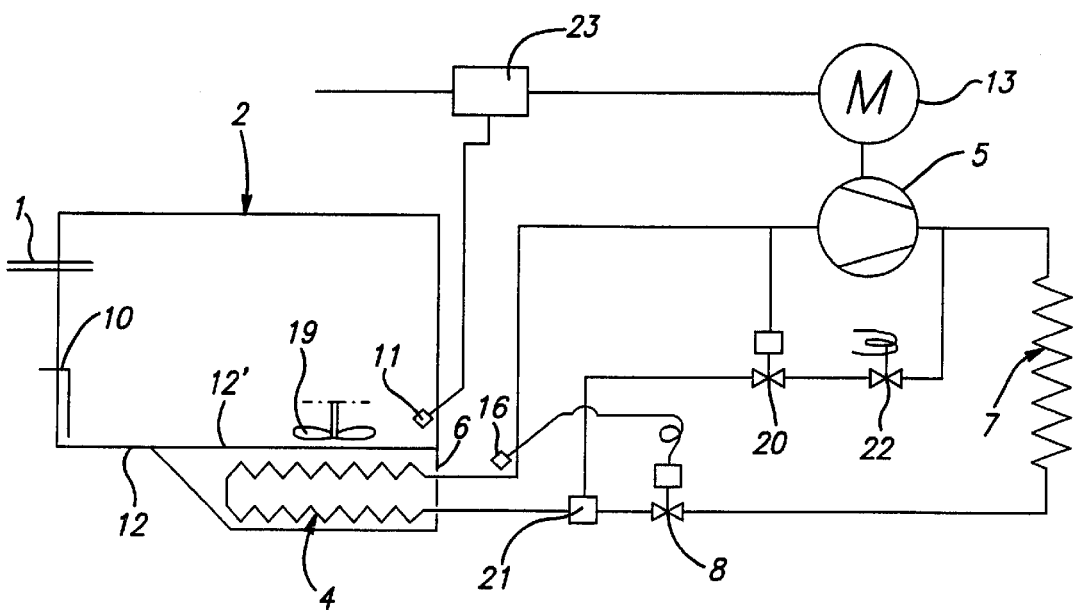

FIG. 2 shows an embodiment where the vaporizing pressure is kept constant by the valve 20 at a low level in the tank. The valve 20 has a pressure sensing connection with the vapour conduit between the evaporator and the compressor. When the vaporizing pressure drops below a pre-set value, the valve opens and admits hot gaseous refrigerant which is mixed with condensed, liquid state refrigerant in the mixing chamber 21. The temperature is equalized by vaporization of liquid state refrigerant, the residue is vaporized in the cooling channel and the flow of vapour, which reaches the suction side of the compressor, corresponds to the pre-set pressure level. When it comes to use for milk cooling in a bulk milk cooler, there is provided a valve 22 which opens and activates hot vapour return at a low milk level in the tank. The valve 22 is operated by the central control unit of the milking equipment. The cooling assembly is started and stopped by the temperature transducer 11, which operates the control equipment 23 for the motor 13 of the cooling compressor 5.

Figure 3:
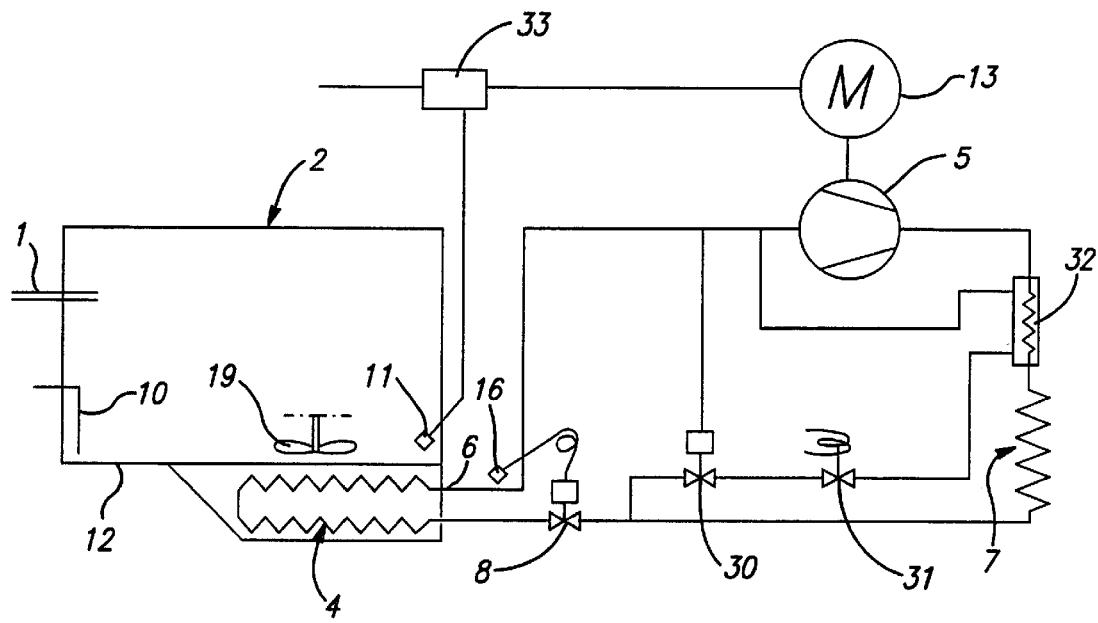

In FIG. 3, there is shown an embodiment wherein a pressure maintaining valve 30 senses the pressure in the suction conduit for return vapour to the compressor, and compensates for a too low pressure by opening up for a flow of refrigerant to an evaporator 32 around the hot gas outlet of the compressor 5. The pressure maintaining action is activated at a low milk level in the tank by opening up the valve 31.

Figure 4:
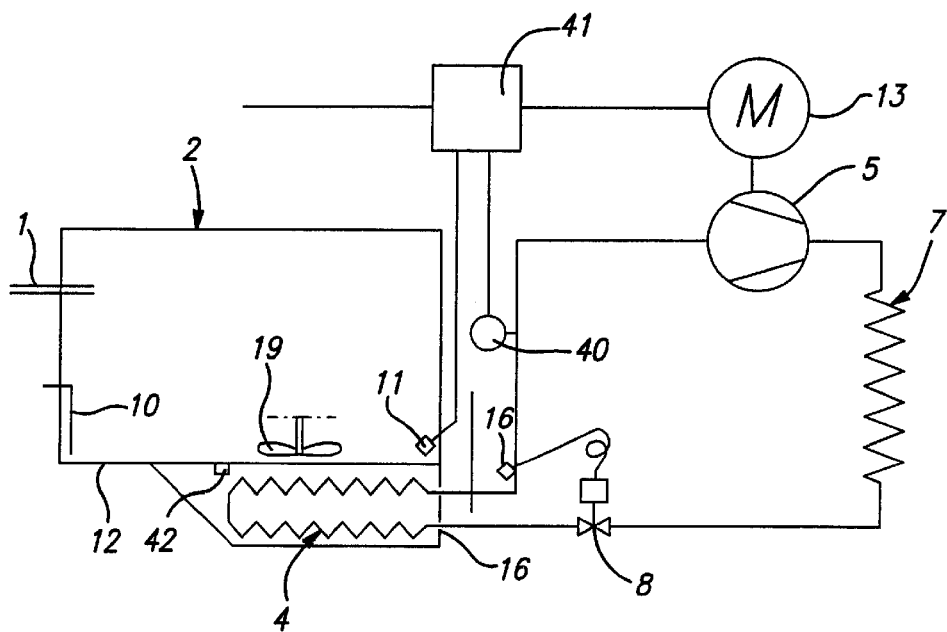

FIG. 4 shows an embodiment wherein a pressure sensor 40 and a control equipment 41 regulates the compressor speed, so that the vaporizing pressure can be kept constant, independently of the heat transfer from milk to refrigerant. In a more advanced embodiment, the pressure level is controlled from the central control unit of the milking equipment, so that the vaporizing pressure is lowered when the milk level in the tank rises and/or the heat transfer between the milk and the bottom of the tank is improved by e.g. a more powerful agitation. When the temperature of the wall 12 of the cooling tank is measured by means of a temperature transducer 42, at one or more critical points, such wall temperature can be used for controlling the vaporizing pressure, so that the heat transfer becomes optimal without any risk of freezing. Said critical point/points will preferably be situated in the region of the evaporator zone of the tank, either on the inner side or on the outer side of the tank wall, or alternatively in hole/holes drilled in the tank wall. The required adjustment is obtained by a combination of compressor speed control and adjustment of the flow characteristic of the expansion valve 8. The milk temperature measured by the temperature transducer 11 in the tank may alternatively affect the compressor speed so that the cooling effect becomes optimal without any risk of freezing.

What is claimed is:

1. A method for controlling the cooling of small milk quantities (milk spots) entering, with time intervals, a cooling tank (2) having at least a bottom wall portion (12) with a milk contacting cooling surface (12') within the tank being part of a cooling circuit, an agitator means (19) being provided within the tank for agitation of the milk in the tank, characterized by the following steps:
   a) providing a means (10) for measuring the milk quantity in the tank, and a temperature transducer (11) for monitoring the milk temperature in the tank,
   b) providing, in series in the cooling circuit, an evaporator (4) connected to the bottom wall portion of the tank, a compressor (5), and a condenser (7),
   c) controlling the temperature of the refrigerant in the evaporator by regulating the vaporizing pressure, so that the temperature of the milk contacting cooling surface (12') is always at least slightly higher than 0° C., whereas the refrigerant temperature in the evaporator (4) is below 0° C. when the compressor (5) is running,
   d) monitoring, by said measuring means, the milk quantity in the tank, and, when said milk quantity turns out to be sufficient/insufficient for the agitator means (19) to work properly, starting/stopping the operation of the agitator means.

2. A method according to claim 1, characterized in that the operation of the compressor (5) is started/stopped, dependent on the milk temperature in the tank, furthermore the operation of the compressor is temporarily interrupted when the vaporizing pressure drops below a set value and the milk level is low.

3. A method according to claim 1, characterized in that the vaporizing pressure is kept constant.

4. A method according to claim 3, characterized in that, for keeping the vaporizing pressure constant or adapted to the actual heat transfer, the compressor (5) capacity is controlled by regulating the speed or power of a motor (13) driving the compressor.

5. A method according to claim 1, characterized in that the condenser (7) is cooled by a flow of air or by a flow of liquid, e.g. water.

6. A method according to claim 1, characterized in that the temperature of the milk contacting cooling surface (12') within the tank is controlled dependent on the temperature difference between the refrigerant temperature in the evaporator (4) and the milk temperature in the tank as established by the temperature transducer (11).

7. A method according to claim 1, characterized in that, when the operation of the agitator means (19) has been started and works satisfactorily, thereby causing an increased milk flow over the milk contacting cooling surface, the refrigerant temperature in the evaporator (4) is lowered.

8. A system for controlled cooling of small milk quantities (milk spots) entering, with time intervals, a milk cooling tank (2) having at least a bottom wall portion (12) comprising, on the milk contacting side thereof, a milk cooling surface (12') being part of an evaporator (4) in a cooling circuit, the tank containing an agitator means (19) being provided for agitation of the milk in the tank; a means (10) for measuring the milk quantity in the tank; said cooling circuit comprising, in series therein, the evaporator (4); a motor (13)-driven compressor (5) being connected to a refrigerant outlet (6) from the evaporator, and, through an interconnected condenser (7) and an expansion valve (8) downstream thereof, to a refrigerant inlet (9) to the evaporator (4), characterized by
   a temperature transducer (11) for monitoring the milk temperature in the tank, control means regulating the operation of the cooling equipment in dependence of the vaporizing pressure when there is a small milk volume in the milk cooling tank (2) and the agitator means (19) cannot work properly, and a vapour pressure sensor (17;40),
   a control equipment (18;23;33; 41) being connected to the temperature transducer (11), for receiving a temperature input, and being connected to the motor (13) driving the compressor (5) for regulating same, and by a temperature sensor (16), which is connected between the evaporator outlet (6) and compressor inlet and senses the temperature of the vapour flow there between, serving to control the expansion valve (8), and
   the pressure sensor (17; 40), is connected between the temperature sensor (16) and compressor inlet and serves to sense the pressure of the vapour and submits an output signal to the control equipment (18; 41) said system controlling the temperature of the refrigerant in the evaporator by regulating the vaporizing pressure, so that the temperature of the milk contacting cooling surface (12') is always at least slightly higher than 0° C., whereas the refrigerant temperature in the evaporator (4) is below 0° C., when the compressor is running.

9. A system according to claim 8, characterized in that the milk quantity measuring means comprises a measuring device integrating milk flow signals received from milk flow meters provided in an automatic milking system the total milk output of which is being supplied to the cooling tank (2).

* * * * *

UNITED STATES PATENT AND TRADEMARK OFFICE
CERTIFICATE OF CORRECTION

PATENT NO. : 6,782,705 B2
DATED : August 31, 2004
INVENTOR(S) : Magnus Lidman et al.

It is certified that error appears in the above-identified patent and that said Letters Patent is hereby corrected as shown below:

Title page,
Item [22], PCT Filed, should read as follows:
-- [22] PCT Filed: Feb. 1, 2001 --.
Items [86] and [87], should read as follows:
-- [86]  PCT No.:  PCT/SE01/00192 --

§371 (c)(1),
(2), (4) Date:  Nov. 25, 2002

[86]  PCT Pub. No.:  WO01/56370

PCT Pub. Date: Aug. 9, 2001 --.

Signed and Sealed this

Nineteenth Day of October, 2004

JON W. DUDAS
*Director of the United States Patent and Trademark Office*